United States Patent
Yoshimura

(10) Patent No.: US 6,911,162 B2
(45) Date of Patent: Jun. 28, 2005

(54) CONDUCTIVE SILICON NITRIDE COMPOSITE SINTERED BODY AND A PROCESS FOR THE PRODUCTION THEREOF

(75) Inventor: Masashi Yoshimura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 374 days.

(21) Appl. No.: 10/172,013

(22) Filed: Jun. 17, 2002

(65) Prior Publication Data

US 2003/0155555 A1 Aug. 21, 2003

(30) Foreign Application Priority Data

Jan. 30, 2002 (JP) ........................................ 2002-020816

(51) Int. Cl.[7] .......................... C04B 35/58; H05B 6/00; B29C 67/00
(52) U.S. Cl. ....................... 252/518; 252/519; 252/520; 264/327; 264/405; 264/472; 501/96; 501/97; 501/98
(58) Field of Search .......................... 252/518.1, 519.1, 252/520.2, 521.3, 500, 518, 519, 520; 501/96, 97, 98; 264/646, 647, 652, 668, 327, 405, 472, 272.11

(56) References Cited

U.S. PATENT DOCUMENTS 5,369,065 A * 11/1994 Yoshimura et al. ......... 501/97.4
5,424,256 A * 6/1995 Yoshimura et al. ......... 501/97.3

FOREIGN PATENT DOCUMENTS

| EP | 1 295 106 A1 | 4/2003 | |
|---|---|---|---|
| EP | 1361 202 A1 | 11/2003 | |
| JP | 10-338576 | * 12/1998 | ......... C04B/35/484 |
| JP | 11-139874 | * 5/1999 | ......... C04B/35/484 |
| JP | 11-139877 | * 5/1999 | ......... C04B/35/584 |
| JP | 11-139882 | 5/1999 | |
| JP | 2000-154064 | * 6/2000 | ......... C04B/35/584 |
| JP | 2000-164064 | 6/2000 | |

OTHER PUBLICATIONS

E. Kamijo, M. Honda, M. Higuchi, H. Takeuchi & T. Tanimura, "Electrical Discharge Machinable $Si_3N_4$ Ceramics," *Sumitomo Electric Technical Review*, No. 24, Jan. 1983, pp. 183–190.
Ceramic 21, vol. 21, No. 8, 1986, pp. 719–725. (Partial English Translation).
Masashi Yoshimura, et al., "Microstructure and Tribological Properties, of Nano–Sized $Sl_2 N_4$" Scripta Materialia, Elsevier, New York, NY, vol. 44, Nos. 8–9, May. 18, 2001.
Yoshimura, Masashi et al., "Synthesis and Functionality of Nanostructured S13N4 by Novel Process", Materials Inegration, vol. 14, No. 1, 2001, pp. 35–39.

* cited by examiner

Primary Examiner—Mark Kopec
Assistant Examiner—Kallambella Vijayakumar
(74) Attorney, Agent, or Firm—McDermott Will & Emery LLP

(57) ABSTRACT

A conductive silicon nitride composite sintered body having an average grain size of 200 nm or less and whose relative roughness (Ra) after electric discharge machining is 0.6 μm or less can be obtained by grinding/mixing a silicon nitride powder and a metal powder together until the average particle size of the silicon nitride powder becomes 30 to 60 nm, and subsequently by molding and sintering. With the contexture that is characteristic of the present invention, it is possible to obtain a conductive silicon nitride composite sintered body having electric conductive particles of 5 to 60 volume percent that is capable of electric discharge machining.

8 Claims, 1 Drawing Sheet

CONDUCTIVE SILICON NITRIDE COMPOSITE SINTERED BODY AND A PROCESS FOR THE PRODUCTION THEREOF

BACKGROUND OF THE INVENTION

1. Field of the Invention

The present invention relates to a silicon nitride composite sintered body having electric conductivity and which is useful as various structural parts and wear resistance parts such as cutting tools and sliding parts.

2. Description of the Related Art

Silicon nitride has been widely used for various structural parts such as vehicle engine parts, cutting tools, and abrasion resistance materials such as roller bearings, and the like, since it is excellent in hardness, mechanical strength, and thermal resistance, and also chemically stable. Recently, in all of these fields, not only have the levels of performance required of materials become extremely high but also the degrees of processing accuracy required of those materials have become strict. As a result, when these materials are used for products, the costs of the products become higher as the costs of processing are higher, which has been the greatest factor in preventing expansion of the markets.

Thus, various processing methods have been proposed. Among them, the most frequently used method is a technique of electric discharge machining that is performed in a state wherein electric conductivity is afforded to a silicon nitride composite sintered body by dispersing conductive particles into a matrix composed of silicon nitride and grain boundary phase.

For example, in Ceramics 21: pp 719–725 (1986), it is described that electric discharge machining is made possible by dispersing conductive particles of from 20 to 40% by volume into $Si_3N_4$ to make a silicon nitride material with electric conductivity. However, the surface roughness of such silicon nitride materials is worse after the electric discharge machining, and surface cracks exist which are attributed to thermal shock and electric discharge at the electric discharge machining. Thus, the resultant materials cannot be used for practical application because of their low mechanical properties unless grinding or polishing is carried out to remove their surface cracks after the electric discharge machining. Also, these materials are low in mechanical strength because their particle sizes are as large as several μm.

SUMMARY OF THE INVENTION

The present invention was derived to solve the above problems. That is, the present invention provides an conductive silicon nitride composite sintered body capable of surface smoothing after the electric discharge machining, which is excellent in mechanical properties, and a process for the production thereof.

The conductive silicon nitride composite sintered body of the present invention, which is composed mainly of silicon nitride and metal nitride each having an average grain size of 200 nm or less, wherein the metal nitride is contained at 5 to 60% by volume, is characterized in that there exists a region where the area ratio of the metal nitride is within a 2/3 power ratio of volume % of the metal nitride ±10% at a region of 10 μm wide and 10 μm long in an arbitrarily selected section of the sintered body and where the area ratio of the metal nitride is not within a 2/3 power ratio of volume % of the metal nitride ±10% at an arbitrarily selected region of 2 μm wide and 2 μm long. The area ratio herein is a percentage of an area excluding the vacancies. The surface roughness (Ra) of the discharged surface is 0.6 μm or less after the electric discharge machining. The metal of the metal nitride is at least one kind of element selected from Groups IVa, Va and VIa, and more preferably is Ti or Ta.

The sintered body of the present invention is obtained by a manufacturing process comprising a step of preparing a silicon nitride powder, a powder of sintering aids, and a metal powder, a step of grinding/mixing these powders until the silicon nitride powder of which the average particle size is from 30 to 60 nm is obtained to make a mixed powder, a step of molding the mixed powder to make a molded body, and a step of sintering the molded body in a non-oxidative atmosphere to make a sintered body. It is desirable to grind and mix until an X-ray diffraction peak of the metal in the powder apparently disappears in the step of grinding/mixing. The metal is at least one kind of element from Groups IVa, Va and VIa, and is preferably Ti or Ta.

According to the present invention, electric discharge machining is made possible by dispersing fine particles composed mainly of metal nitride into the fine matrix composed mainly of $Si_3N_4$, and smoothing of the discharged surface after electric discharge machining is possible. Thus, even with such electric discharge machining, a conductive silicon nitride composite sintered body which is excellent in mechanical properties can be provided more inexpensively than in the past.

DESCRIPTION OF THE PREFERRED EMBODIMENTS

Figure 1:
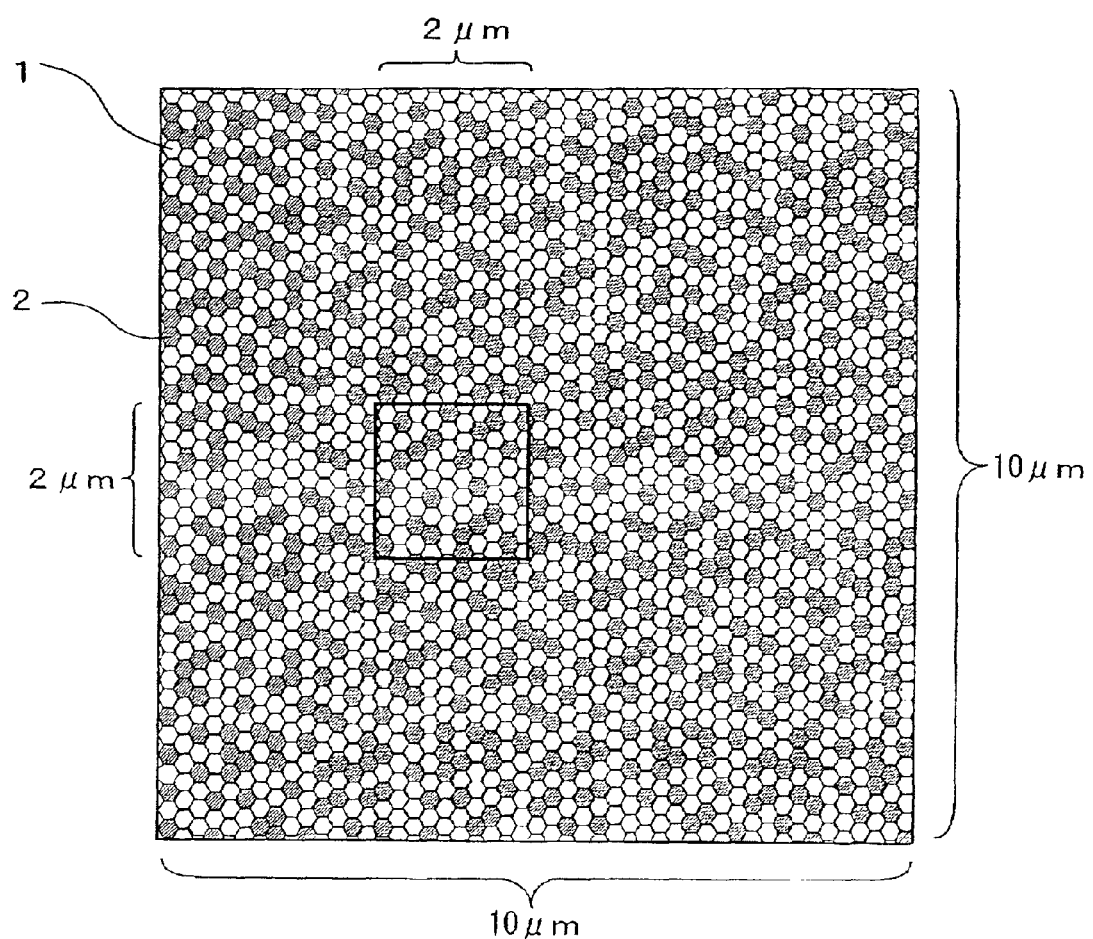
FIG. 1 is a schematic illustration showing a sectional contexture of the silicon nitride composite sintered body of the present invention wherein the area ratio of TiN is within a 2/3 power ratio of volume % of TiN ±10% at a region of 10 μm wide and 10 μm long whereas the area ratio of TiN is not within a 2/3 power ratio of volume % of TiN at a region of 2 μm wide and of 2 μm long (a white part 1 is $Si_3N_4$, and a black part 2 is TiN).

The composite sintered body of the present invention is described in detail below including the process for the production thereof. "Silicon nitride" in the present invention indicates silicon nitride ($Si_3N_4$) and/or ceramics containing sialon as a major crystal phase and includes oxynitriding silicon and the like. Also, "metal nitride" includes those mixed in with oxygen. Further, "silicon nitride composite sintered body" indicates materials wherein a different component is dispersed and compounded in the matrix composed mainly of such ceramics as the major crystal phase.

Each average grain size of the silicon nitride particles and the dispersed particles composed mainly of the metal nitride in the composite sintered body of the present invention is 200 nm or less. In the case of utilizing the composite sintered body with a larger average grain size than this, the relative surface roughness becomes worse after the electric discharge machining because the materials are not effectively eliminated at the electric discharge machining.

Electric conductivity is required to enable electric discharge machining which results in a smooth surface and high mechanical strength. Therefore, it is necessary to disperse conductive particles in a material so as to be contained therein in network form on the order of a nanometer. The preferable added amount of the metal nitride which is in the form of dispersed particles is 5% by volume or more and 60% by volume or less. When it is less than 5% by volume, the amount of metal nitride become less, so it is difficult to obtain electric conductivity required for the electric discharge machining. On the other hand, when it is more than 60% by volume, particle growth readily occurs because the dispersed particles tend to combine with one another during sintering, which results in deterioration of the mechanical properties.

There exists a region where an area ratio of the metal nitride is within a 2/3 power ratio of volume % of the metal nitride ±10% at a region of 10 μm wide and 10 μm long in an arbitrarily selected section of the sintered body and where an area ratio of the metal nitride is not within a 2/3 power ratio of volume % of the metal nitride ±10% at an arbitrarily selected region of 2 μm wide and 2 μm long. Such materials enable electric discharge machining even when electric conductive particles having a low volume percent such as 5% by volume are dispersed. In a sintered body in which an area ratio of the metal nitride is not within a 2/3 power ratio of volume % of the metal nitride ±10% at a region of 10 μm wide and 10 μm long in an arbitrarily selected section, the surface relative roughness (Ra) of the discharged surface after the electric discharge machining can not be made to be 0.6 μm, because the contexture is not uniform. In the material wherein the area ratio of metal nitride is within the 2/3 power ratio ±10% based on % by volume of the metal nitride in the given region of 2 μm wide and 2 μm long at a given section in all portions, sufficient electric conductivity capable of performing the electric discharge machining can not be obtained when the volume of the conductive dispersed particles is 30% by volume or less, because the contexture of the sintered body is uniform Electric discharge machining becomes possible with from 5 to 60% by volume of the conductive dispersed particles by dispersing the metal nitride such that there exists a region where the area ratio of the metal nitride is within a 2/3 power ratio of volume % of the metal nitride ±10% at a region of 10 μm wide and 10 μm long in an arbitrarily selected section of the sintered body and where the area ratio of the metal nitride is not within a 2/3 power ratio of volume % of the metal nitride ±10% at an arbitrarily selected region of 2 μm wide and 2 μm long. A material thus obtained has a surface relative roughness (Ra) of 0.6 μm or less at the discharged surface after the electric discharge machining. The silicon nitride composite sintered body that has a discharged surface whose relative roughness (Ra) is 0.6 μm or less is a material having a smooth discharged surface and excellent mechanical properties after the electric discharge machining.

The nitride that is to be dispersed particles may be the nitride of a transition metal with electric conductivity. However, in order to sufficiently achieve the target effect of the present invention, preferable is the nitride of an element from Group IVa (Ti, Zr, or Hf), Group Va (V, Nb, or Ta) and Group VIa (Cr, Mo, or W) of the Periodic Table. Among them, particularly the nitride of Ti or Ta is more preferable.

Some amounts of carbon and oxygen may be contained in the metal nitride in the form of dispersed particles. For example, the form in which nitrogen is partially compounded with carbon and/or oxygen is allowed, and carbon and/or oxygen may exist alone. Also, the nitrides containing multiple metal elements (composite nitride) may co-exist. In order to make the multiple nitrides of metal elements thus co-exist, powders of multiple metals are previously mixed. Or they may be added in a form of compound of metals or a composite nitride. Added particles of different metal elements are dispersed from one another by adding in a form containing two or more kinds of metal elements in this way. Since particle growth is inhibited by one another as a result of such dispersion, the dispersed average particle size of the dispersed particles becomes smaller than that in the case of containing one type. This results in further improvement of the relative surface roughness of the discharged surface.

The material of the present invention is obtained by the process comprising a step of preparing a silicon nitride powder, a metal powder and a powder of sintering aids, a step of grinding/mixing these powders until the average particle size of the silicon nitride powder becomes 30 to 60 nm so as to make a mixed powder, a step of molding the mixed powder to make a molded body, and a step of sintering the molded body in a non-oxidative atmosphere to make a sintered body. The sintering in the non-oxidative atmosphere is preferably performed at a temperature range from 1100 to 1700° C. When grinding and mixing is done until the average particle size of the silicon nitride powder becomes less than 30 nm in the step of grinding /mixing, it is difficult to obtain the silicon nitride composite sintered body having the contexture of the present invention since the contexture of the sintered body is uniformized.

The raw material powders may be any of those commercially available. The crystal type of $Si_3N_4$ may be either α or β type. And either imide decomposed powder or directly nitrided powder may be used. Both $Si_3N_4$ powder and powder of the sintering aids preferably have an average particle size of 5 μm or less, and more preferably 2 μm or less, since the smaller the average particle size, the more desirable in terms of ease of particle size control and improvement in the mechanical properties. The smaller the average particle size of the metal powder added for the dispersed particles, the more desirable it is, and it is preferably about 10 μm or less and more preferably 5 μm or less.

Grinding and mixing are carried out such that the average particle size of silicon nitride powder in the grinded/mixed mix powder is from 30 to 60 nm. It is desirable that mixing is carried out by a method with grinding means such as a ball mill or attritor. For example, as described in Japanese Laid-Open Patent No. 338576/1998, mechanical alloying is carried out using such a mixing apparatus. According to this means, a fine mixed powder with an average particle size of 60 nm or less is obtained by plastic deformation ability of the metal powder that is added as the source of particles to be dispersed as mentioned above. Conditions such as grinding acceleration, charging amount ratio between a powder and a powder grinding medium, grinding time period and the like are appropriately selected according to the level of the average particle size of the initial raw material powder.

A $Si_3N_4$ powder, a powder of sintering aids and a metal powder to become dispersed particles may be extremely fine particles obtained beforehand by chemical or physical means from metals and organic/inorganic salts. Such means include, for example, a method in which co-precipitates are obtained from organic salts of metals, a method in which particles are produced by heat treatment from an inorganic composite compound such as Si—Ti—N, and the like. Also, the grinding means includes a vibration grinding method and the like in addition to the above.

The molding methods known in the art such as a common dry press molding method, an extrusion molding method, a doctor blade molding method, and an injection molding method can be used for the mixed powder prepared in the above manner. The most preferable molding method can be selected for quality and production in accordance with the desired shape. The bulk density can be also previously increased to enhance moldability by granulating a mixed powder into granules prior to the molding after the grinding and mixing.

It is preferable that the molded body is sintered at a temperature range from 1100 to 1700° C. in a non-oxidative atmosphere. With such a temperature range the relative density of the sintered body becomes 95% or more, which results in the stable mechanical strength thereof being readily obtained after electric discharge machining. The heating means of sintering may be a common sintering at normal pressure, but are preferably the means such as a pulse electric discharge sintering method and a sintering method by high-frequency induction heating in which the temperature of the molded body can be raised in a short time and the molded body can be uniformly heated. In this case, the sintering temperature is preferably in a range of from 1100 to 1500° C. When the sintering temperature is 1100° C. or less, the molded body is not sintered sufficiently. Also, when it is more than 1500° C., grain growth becomes remarkable and thus it becomes difficult to obtain the composite sintered body of the present invention. The sintering may be carried out under a pressure applied with an ambient gas or applied mechanically from outside. In this case, the sintering temperature is preferably in a temperature range from 1200 to 1700° C., and the method for sintering is appropriately selected.

TABLE I

| | Ti added Amount (Amount convertd as TiN) | Mixing time period (Hr) | Particle size of $Si_3N_4$ (nm) |
|---|---|---|---|
| 1-1* | 0 | 4 | 200 |
| 1-2 | 5 | 4 | 55 |
| 1-3* | 5 | 16 | 15 |
| 1-4 | 20 | 6 | 40 |
| 1-5* | 20 | 24 | 12 |
| 1-6 | 40 | 8 | 50 |
| 1-7 | 50 | 4 | 50 |
| 1-8 | 60 | 12 | 60 |
| 1-9* | 70 | 12 | 60 |
| 1-10* | 20 | 0.5 | 600 |

Asterisk * indicates Comparative Example

The produced mixed powder was pressurized and sintered by a pulse electric heating method with a pressure of 30 MPa in a nitrogen atmosphere under conditions shown in Table II. Specular surface processing was provided onto the surface of the resultant sintered body. Subsequently, the image of the polished surface of the sample was taken by electron microscopy at a magnification of 50,000. The average grain sizes of $Si_3N_4$ particles and the dispersed particles (W were confirmed by statistically analyzing the image in a given visual field using the segment division method.

TABLE II

| | Sintering temperature (° c.) | Relative density (%) | Grain size of $Si_3N_4$ (nm) | Grain size of TiN (nm) | Electric conductivity | Relative roughness of discharged surface (nm) | Fracture strength (MPa) | 10 × 10 TiN ratio | 2 × 2 TiN ratio |
|---|---|---|---|---|---|---|---|---|---|
| 1-1* | 1500 | 98 | 1200 | 1500 | x | — | — | — | — |
| 1-2 | 1400 | 99.5 | 90 | 90 | ○ | 0.6 | 1250 | ○ | x |
| 1-3* | 1400 | 98 | 50 | 60 | x | — | — | ○ | ○ |
| 1-4 | 1300 | 99 | 90 | 95 | ○ | 0.6 | 1200 | ○ | x |
| 1-5* | 1300 | 99 | 50 | 60 | x | — | — | ○ | ○ |
| 1-6 | 1100 | 98 | 120 | 150 | ○ | 0.4 | 1100 | ○ | x |
| 1-7 | 1100 | 98 | 120 | 160 | ○ | 0.2 | 1050 | ○ | x |
| 1-8 | 1100 | 98 | 130 | 140 | ○ | 0.2 | 950 | ○ | x |
| 1-9* | 1100 | 99 | 110 | 150 | ○ | 0.2 | 560 | ○ | x |
| 1-10* | 1300 | 99 | 1500 | 1800 | ○ | 0.9 | 450 | x | x |

Asterisk * indicates Comparative Examples

EXAMPLES

Example 1

An α type silicon nitride powder with an average particle size of 0.8 μm and a metal Ti powder with an average particle size of 10 μm, as well as sintering aids $Y_2O_3$ of 2.5% by weight and $Al_2O_3$ of 1% by weight, respectively relative to the weight of silicon nitride were prepared. All of the powders are commercially available. The amount of Ti shown in Table I was prepared, and subsequently, mixing was carried out for the time period shown in Table I using a planetary ball mill having an acceleration of 150 G. The amount of the metal Ti to be added herein is an amount calculated on the assumption that the whole Ti would be converted into metal nitride. The presence or absence of the metallic peak was determined by X-ray diffraction for the resultant powder. The average particle size was calculated from the X-ray diffraction data of the sample using Hall's formula described in Waseda and Matsubara, "X-ray Structural analysis" page 119–126 (Apr. 10, 1998, published by Uchida Rohkakuho). The results are shown in Table I.

Further, the results of the properties examined as described below are shown in Table II. The electric conductivity was represented by a circle in a case where the electric resistance capable of performing the electric discharge is $10^0 \Omega \cdot cm$ or less when measured by a four-point electric resistance measuring instrument, and by a cross when it is more than $10^0 \Omega \cdot cm$. Further, the samples were cut using an electric discharge machine (Sodick AP450), and the relative roughness (Ra) of the discharged surface was determined by a contact type surface roughness meter. Also, the samples were finished to the shape of a strength test piece defined in JIS R1601, and the three-point flexural strength was determined according to the definition of the JIS standard. The surface that was subject to tensile stress during the strength test had been left in the same state as it was subjected to electric discharged machining. The images of the polished surfaces of the samples were taken by a 30,000 magnification electron microscope. Subsequently, an area ratio of TiN particles was calculated at a region of 10 μm wide and 10 μm long and at a region of 2 μm wide and 2 μm long, which were taken arbitrarily. In each region, the samples in which the area ratio is within a 2/3 power ratio of volume % of TiN±10% were represented by circles, and those otherwise were represented by crosses.

FIG. 1 shows a schematic illustration of a sectional contexture of a sample in which the area ratio of TiN particles is within a 2/3 power ratio of volume % of TiN±10% at a region of 10 μm wide and 10 μm long whereas the area ratio of TIN is not within a 2/3 power ratio of volume % of TiN±10% at a region of 2 μm wide and 2 μm long. In the figure, a white part 1 and a black part 2 indicate $Si_3N_4$ and TIN, respectively. It is shown that the area ratio of TiN particles is within a 2/3 power ratio of volume % of TiN±10% in the entire FIG. 1, whereas it is not within a 2/3 power ratio of volume % of TiN±10% at an arbitrarily selected region of 2 μm wide and 2 μm long as shown in the figure.

As can be seen in Tables I and II, the relative density in the sintered body of the present invention is 95% or more, and the metal nitride (TiN) is dispersed unevenly. As a result, electric conductivity is induced from a low added amount of the electric conductive particles. Also, the relative roughness (Ra) of the discharged surface after electric discharge machining is 0.6 μm or less, and the fracture strength is as high as 900 MPa or more.

What is claimed is:

1. A conductive silicon nitride composite sintered body comprising silicon nitride and metal nitride as its main components, said components each having an average grain size of 200 nm or less, said sintered body including the metal nitride of 5 to 60% by volume, said sintered body including, in an arbitrarily selected section thereof, a region where the area ratio of the metal nitride is within a 2/3 power ratio of volume % of the metal nitride ±10% at a region of 10 μm wide and 10 μm long and where the area ratio of the metal nitride is not within a 2/3 power ratio of volume % of the metal nitride ±10% at a region of 2 μm wide and 2 μm long.

2. The conductive silicon nitride composite sintered body according to claim 1, comprising a discharged surface having a relative roughness (Ra) of 0.6 μm or less after electric discharge machining.

3. The conductive silicon nitride composite sintered body according to claim 1, wherein a metal of said metal nitride is at least one kind of element selected from Groups IVa, Va and VIa of the Periodic Table.

4. The conductive silicon nitride composite sintered body according to claim 1, having a relative density of 98 to 99.5%.

5. The conductive silicon nitride composite sintered body according to claim 3, wherein the metal of said metal nitride is Ti or Ta.

6. A process for producing a conductive silicon nitride composite sintered body, comprising the steps of:

preparing a silicon nitride powder, a powder of sintering aids and a metal powder;

grinding/mixing these powders until the average particle size of the silicon nitride powder becomes in a range from 30 to 60 nm so as to obtain a mixed powder;

molding the mixed powder to make a molded body; and sintering the molded body in, a non-oxidative atmosphere to form a sintered body including, in an arbitrarily selected section thereof, a region where the area ratio of the metal nitride is within a 2/3 power ratio of volume % of the metal nitride ±10% at a region of 10 μm wide and 10 μm long and where the area ratio of the metal nitride is not within a 2/3 power ratio of volume % of the metal nitride ±10% at a region of 2 μm wide and 2 μm long.

7. The process for producing a conductive silicon nitride composite sintered body according to claim 6, wherein said metal is at least one kind of element selected from Groups IVa, Va and VIa.

8. The process for producing a conductive silicon nitride composite sintered body according to claim 7, wherein said metal is Ti or Ta.

* * * * *